D. J. CAMPBELL.
DEVICE FOR TESTING PISTON RINGS.
APPLICATION FILED OCT. 10, 1911.
1,036,448.
Patented Aug. 20, 1912.
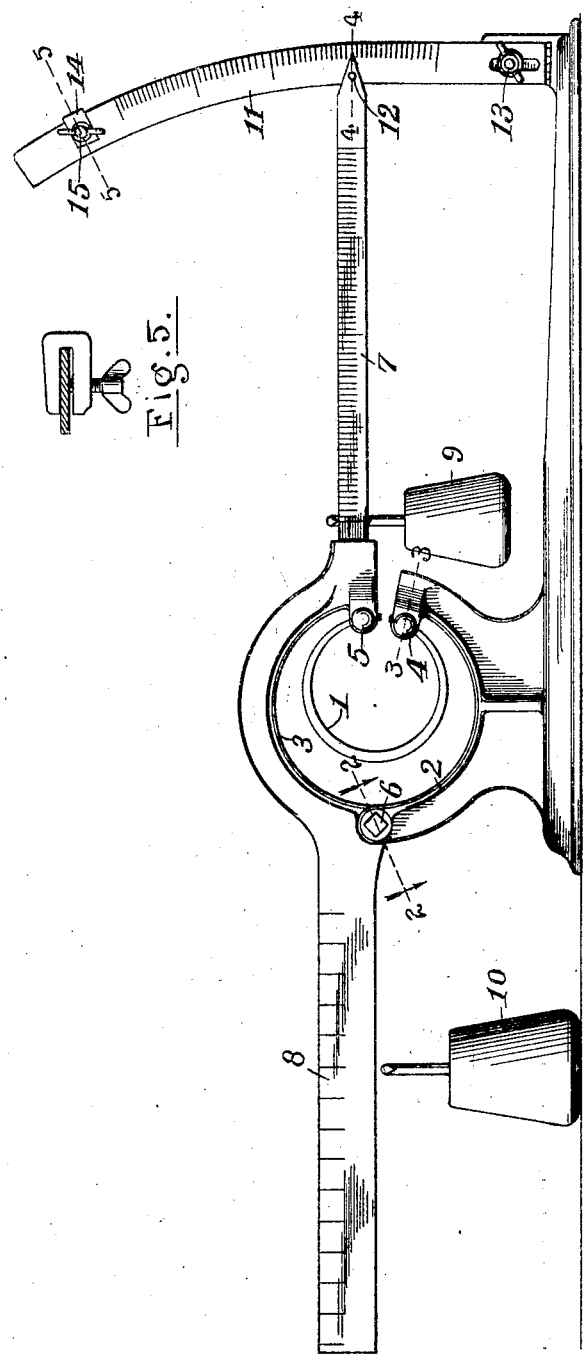
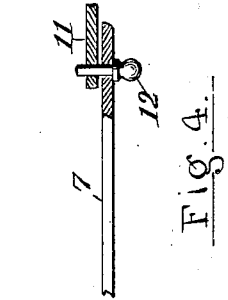
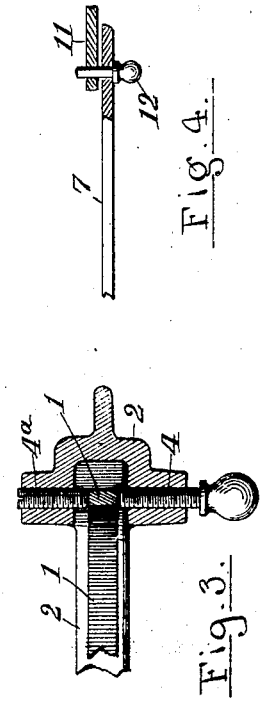
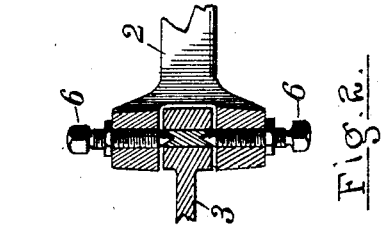
Witnesses
Inventor
Donald J. Campbell
By Luther V. Moulton
Attorney

UNITED STATES PATENT OFFICE.

DONALD J. CAMPBELL, OF MUSKEGON, MICHIGAN.

DEVICE FOR TESTING PISTON-RINGS.

1,036,448.  Specification of Letters Patent.  Patented Aug. 20, 1912.

Application filed October 10, 1911. Serial No. 653,856.

*To all whom it may concern:*

Be it known that I, DONALD J. CAMPBELL, a citizen of the United States of America, residing at Muskegon, in the county of Muskegon and State of Michigan, have invented certain new and useful Improvements in Devices for Testing Piston-Rings; and I do hereby declare the following to be a full, clear, and exact description of the invention, such as will enable others skilled in the art to which it appertains to make and use the same.

My invention relates to improvements in devices for testing piston rings and its object is to provide a device adapted to readily determine the resilience and resistance of piston rings and other like structures and to provide the device with various new and useful features as hereinafter more fully described and particularly pointed out in the claims.

My device consists essentially of a fixed member and a movable member adapted to be secured to the respective ends of the ring adjacent the division therein, a beam or arm attached to the movable member and carrying an index, a scale to indicate the amount of movement of the arm and a weight applied to the arm and adjustable thereon said movable member preferably having oppositely projecting weighted arms whereby both the expansion and contraction of the ring may be tested and in various details of construction and arrangement as will more fully appear by reference to the accompanying drawings, in which:—

Figure 1 is a side elevation of a device embodying my invention; Fig. 2 an enlarged detail of the pivot of the jaws taken on the line 2—2 of Fig. 1; Fig. 3 the same of one of the clamps for attaching the ends of the ring to the respective jaws; Fig. 4 a detail of the means for holding the weighted lever 7 in neutral position on the scale; and Fig. 5 a detail of the stop for the beam.

Like numbers refer to like parts in all of the figures.

1 represents a piston ring in position to be tested.

2 is a fixed semicircular jaw and 3 a similar semicircular jaw oppositely arranged and movable relative to the jaw 2. These jaws at one side are pivoted to each other on pivot screws 6 whereby the jaw 3 turns freely about the axis of the pivot, its movable end adapted to move toward and away from the opposing end of the jaw 2. The ends of these jaws opposite the pivot are each provided with a clamp to engage the respective ends of the ring and hold the same in fixed relation to the respective ends of the jaws. This clamp consists preferably of a binding screw 4 and an adjustable screw 4ª engaging the opposite sides of the ring whereby rings of different widths can be securely attached to the respective jaws without straining the spring from its normal shape. These screws are rounded at the ends to permit the ring to turn therebetween and thus avoid frictional resistance to movement.

7 is an arm or beam projecting from the movable end of the jaw 3 and rigidly secured thereto. 8 is a substantially similar beam projecting oppositely from the pivoted end of the jaw 3.

9 and 10 are weights respectively adjustable on the respective beams whereby the weight 9 tends to close the ring and reduce its diameter and the weight 10 tends to open the ring and increase its diameter, the leverage of the respective beams being different, the arm 8 being a shorter lever than the arm 7. The weights 9 and 10 have corresponding different weights whereby when each is adjusted to similar portions of the scale on the respective beams the number of pounds of strain on the ring will be equal in each case.

11 is a scale opposite the pointed end of the arm 7 whereby the amount of expansion or contraction of the ring is indicated on the scale. An opening is made in the scale 11 opposite the zero position—the beam 7—and a pin 12 is removably inserted in the beam to hold the same at this position while inserting the ring in place. When both weights are at the zero mark on the respective arms the device is so proportioned that the beams will balance with the index or pointed end of the beam 7 at zero on the scale 11. Any slight variation from this position can be readily corrected by adjusting the scale 11 by means of the slotted opening therein and the thumb screw 13. To limit the movement of the beam 7 I prefer also to use a clamp 14 adjustable on the scale 11 and held by a thumb screw 15.

In operation, the device is adjusted to zero on the scale and the ends of the ring 1 securely attached to the respective jaws of the device. The screws 4 and 4ᵃ having rounded ends will securely hold the ring from moving relative to the ends of the jaws and at the same time permit the movable jaw 3 to rise and fall without appreciable resistance to the same. By moving the weight 9 out on the beam 7 the jaws will be closed more or less, the position of the weight on the beam indicating the strain upon the ring and the position of the pointed end of the beam indicating on the scale the amount that the beam has moved from the horizontal and closed the ring. When the weight 9 is moved to zero position again if there has been no bending or permanent set imparted to the ring the beam 7 will swing back to the zero position on the scale. Obviously movement of the weight 10 on the arm 8 will expand the ring, the amount of expansion being indicated on the scale 11 by upward movement of the beam 7 which will again return to the zero position if there has been no bending or permanent set imparted to the ring. The ring may thus be readily tested for the amount of strain required to open or close it as the case may be or the amount of expansion or compression that it will withstand without taking on a permanent change of form.

What I claim is:—

1. A piston ring tester, comprising a fixed member and a movable member, means for attaching said members to the respective ends of a divided ring, oppositely movable beams connected to said movable member to move the same in opposite directions, a weight adjustable on one beam to apply expanding stress to the ring, a weight on the other beam to apply contracting stress to the ring, and means for indicating the amount of said stresses.

2. A piston ring tester comprising a fixed member, and a movable member pivoted thereto, means for attaching a divided piston ring to the fixed member and to the movable member, beams fixed on the movable member and projecting oppositely from the pivot of the same, a weight adjustable on each beam to oppositely move said member and means for measuring said movements.

3. A piston ring tester, comprising a fixed jaw and a movable jaw pivoted to each other and adapted to surround the ring, means for attaching the ends of the ring to the respective jaws, a scale beam projecting from the movable jaw, a weight adjustable on said beam, an oppositely projecting beam on the movable jaw and a weight adjustable on the last named beam.

4. A piston ring tester, comprising a fixed member and a movable member, opposing clamping screws in each member having rounded ends to pivotally engage the respective sides of the ring near its ends, a beam connected to the movable member and a weight adjustable on the beam.

5. A piston ring tester, comprising a pair of semi-circular jaws pivoted to each other at one side, one jaw being fixed and the other movable, clamping screws in the jaws to engage a ring, oppositely projecting beams on the movable jaws, a weight adjustable on each beam and a scale opposite the outer end of one of the beams.

6. A piston ring tester, comprising a pair of semi-circular jaws pivoted to each other at one side, one jaw being movable and the other jaw fixed, clamping screws in the opposite side of said jaws to engage a piston ring, a scale beam projecting from the movable jaw, a scale near the outer end of said beam and a weight adjustable on said beam.

7. A piston ring tester, comprising a fixed member and a movable member, means for attaching the same to the respective ends of a piston ring, a scale beam projecting from the movable member, a scale near the outer end of the beam, a stop adjustable on the scale to engage the beam and limit its movement, a pin removably inserted in the beam and scale to hold the beam, and means for longitudinally adjusting the scale.

In testimony whereof I affix my signature in presence of two witnesses.

DONALD J. CAMPBELL.

Witnesses:
ADAM PYLE,
I. A. WYANT.